Sept. 14, 1965   H. E. LUEBKEMANN   3,205,724
RELEASABLE OVERRUNNING CLUTCH
Filed April 5, 1962   3 Sheets-Sheet 1

INVENTOR.
HARRY E. LUEBKEMANN
BY Howard Kiser
& Jack J. Earl
ATTORNEYS.

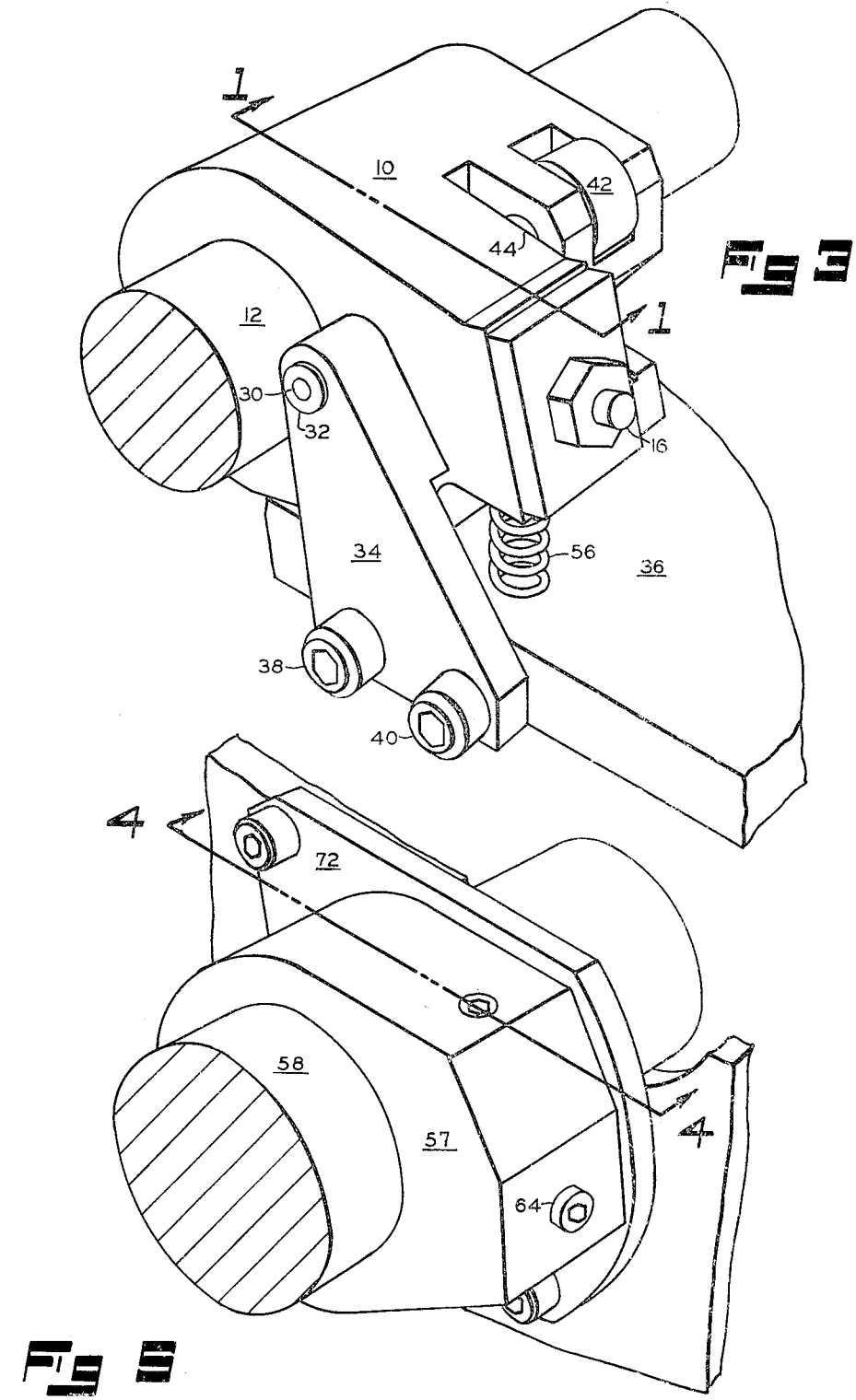

Sept. 14, 1965  H. E. LUEBKEMANN  3,205,724
RELEASABLE OVERRUNNING CLUTCH
Filed April 5, 1962  3 Sheets-Sheet 3

3,205,724
RELEASABLE OVERRUNNING CLUTCH
Harry E. Luebkemann, Cincinnati, Ohio, assignor to The Cincinnati Milling Machine Co., Cincinnati, Ohio, a corporation of Ohio
Filed Apr. 5, 1962, Ser. No. 185,461
4 Claims. (Cl. 74—128)

This invention relates to a one way drive transmission and more particularly to a releasable overrunning clutch for incremental rotation of a shaft.

One way clutches are well known in the mechanical arts. There are sprag and roller type clutches which are advantageous in incremental rotation of a shaft because the size of an increment of rotation may be readily varied, especially in a range of very small increments. These clutches are not readily releasable in the event that the shaft would be required to be rotated freely in either direction by other transmission means. On the other hand, ratchet and pawl type overrunning clutches may be readily released by the withdrawal of the pawl from the ratchet. However, the minimum size of an increment of rotation and the difference between sizes of increments is fixed by the pawl design and ratchet tooth spacing.

An object of this invention is to provide a releasable overrunning clutch to transmit increments of rotation which are infinitely variable between a fixed maximum increment and lower limit increment approaching zero rotation.

A further object of this invention is to provide a releasable one way drive clutch which is simple in construction yet highly effective.

Another object of this invention is to provide a releasable overrunning clutch in which adjustment can be made to regulate the amount of break-loose force required at the reversal from drive to idle return movement.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

In the preferred form, this invention utilizes a clutch housing which is received loosely over a shaft. A cavity within the housing provides space between the shaft and an internal wedge surface of the housing. A sprag member, in the preferred form a roller, is received in the cavity between the shaft and wedge surface. The diameter of the roller is slightly greater than the minimum clearance between the shaft and the wedge surface. A yieldable plunger is included in the housing and engages a side of the roller to cause the roller to engage the shaft and the wedge surface simultaneously. As the housing is rotated in one direction, the roller is caused to wedge between the shaft and wedge surface and to carry the shaft with the housing. When the housing is rotated in the opposite direction, the roller does not wedge so that the shaft is not carried back with the housing. The roller is carried back with the housing but it is only in loose contact with the shaft and wedge surface. A fixed release pin extends into the cavity on the side of the roller opposite the yieldable plunger. As the roller is carried back with the housing in the return direction, the roller is carried into contact with the fixed release pin which forces the plunger to yield and moves the roller out of concurrent contact with the shaft and wedge surface. The housing is stopped with the roller in this condition. The shaft may then be freely rotated in either direction relative to the housing.

A clear understanding of the construction and operation of this invention may be obtained from the following detailed description with reference to the attached drawings wherein:

FIG. 3 is a perspective view of a clutch mechanism.

FIG. 6 is a diagrammatic representation of a clutch.

Figure 2:
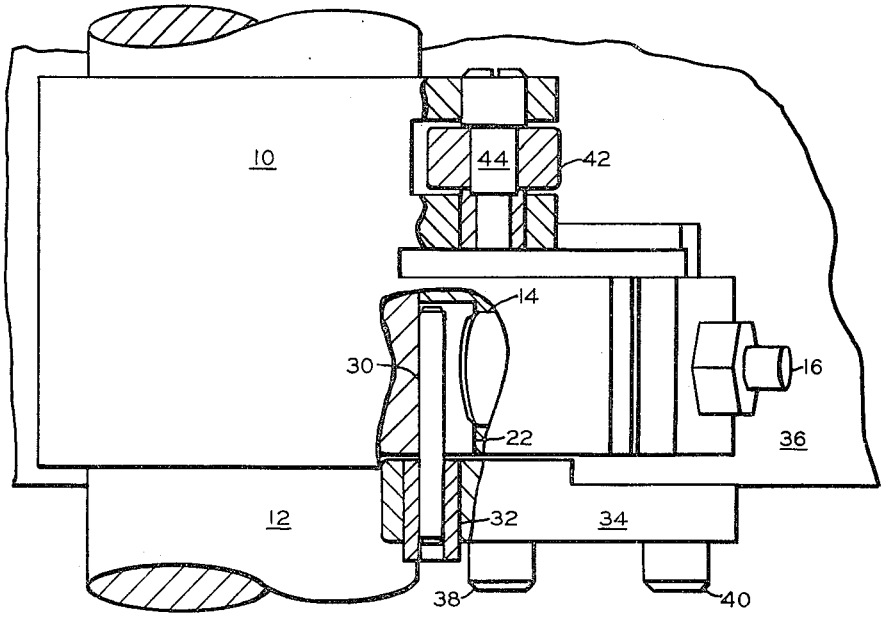
FIG. 2 is a top view, partly in section of the clutch of FIGS. 1 and 3.
Figure 1:
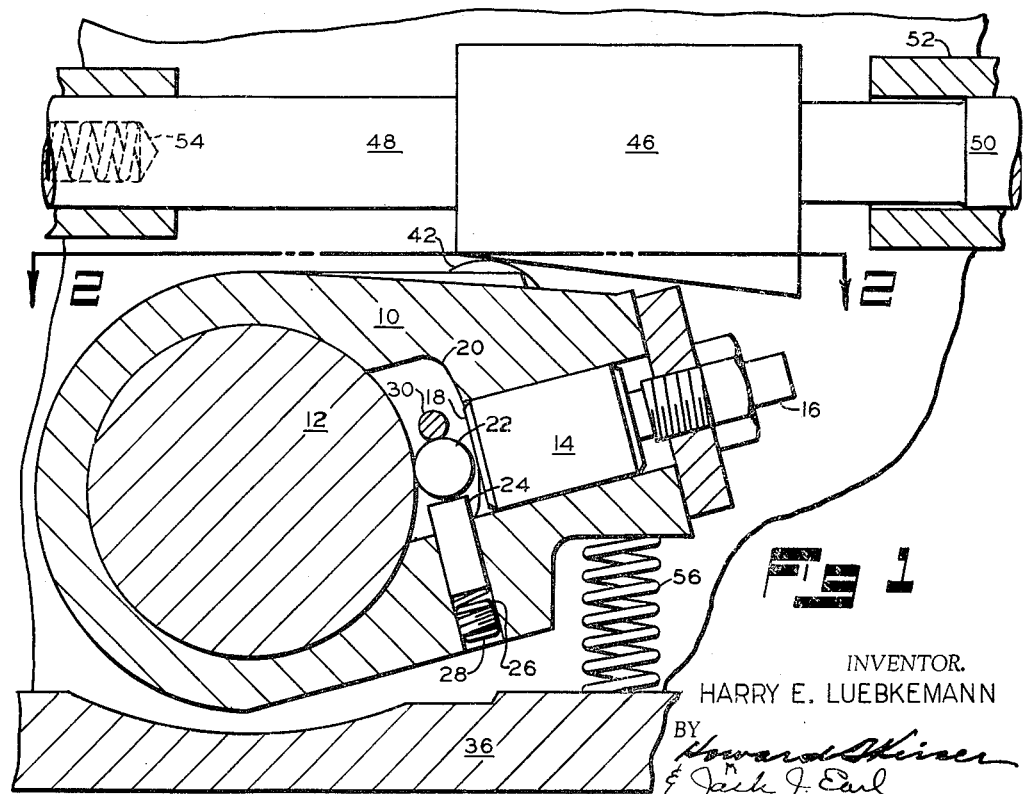
FIG. 1 is a section through a clutch mechanism as indicated by line 1—1 of FIG. 3.

The clutch in FIGS. 1, 2, and 3 is constructed with a housing 10 that is rotatably received over a shaft 12 which is to be rotated in small increments in one direction but which must be freely rotatable in both directions by other means (not shown) connected to the shaft 12. As shown in FIG. 1, the housing 10 has a wedge member 14 which is axially adjustable in the housing 10 toward and away from the shaft 12 by rotation of an adjusting screw 16. A plane end face 18 of the member 14 is spaced from the shaft 12 and forms a wedge surface in a cavity 20 which extends in the housing 10 part way around the shaft 12. A cylindrically shaped roller 22 is received in the cavity 20 between the wedge surface 18 and the shaft 12. The diameter of the roller 22 is slightly greater than the minimum clearance between the shaft 12 and wedge surface 18. A plunger 24 is slidably received in the housing 10 for movement toward and away from the roller 22. A spring 26 held in the housing 10 by a screw 28 tends to push the plunger 24 toward the roller 22 to hold the roller 22 in concurrent contact with the shaft 12 on one side and the wedge surface 18 on the other. As shown in FIGS. 2 and 3, a release pin 30 is fixed in a bushing 32 which in turn is fixed in a bracket 34 secured to a support member 36 by a pair of screws 38, 40. The release pin 30 extends into the cavity 20 (FIG. 1) on the side of the roller 22 opposite the plunger 24.

In the position shown by FIG. 1, the housing 10 is in the released position where the roller 22 has been forced against the plunger 24 by the release pin 30 until the plunger 24 has yielded slightly. The roller 22 is not in concurrent contact with the shaft 12 and wedge surface 18. Therefore, the shaft 12 may be rotated freely in either direction without affecting the housing 10. However, as the housing 10 is rotated clockwise, the roller 22 will be moved away from the fixed release pin 30 and the plunger 24 will move the roller 22 into simultaneous contact with the shaft 12 and wedge surface 18. When the housing 10 is rotated clockwise, the roller 22 tends to move toward the area of least clearance between the shaft 12 and member 14 and therefore wedges in the reduced space between the shaft 12 and wedge surface 18. This causes the shaft 12 to be carried along with the housing 10. When the housing 10 is rotated back counter-clockwise, as viewed in FIG. 1, the roller 22 tends to move toward the area of greatest clearance between the shaft 12 and wedge surface 18 and the housing 10 is rotated without causing the shaft 12 to rotate counter-clockwise. The plunger 24 will cause the roller 22 to follow back around with the housing 10 in the counter-clockwise direction in loose contact with both the shaft 12 and wedge surface 18. The roller 22 will be moved with the housing 10 until the pin 30 is engaged by the roller 22 which is then shifted away from concurrent contact with the shaft 12 and wedge surface 18. The clutch is then in its released condition again.

The maximum amount of rotation which may be imparted to the shaft 12 by any single clockwise stroke of the housing 10 is limited by the space between the fixed pin 30 and the upper edge of the cavity 20.

Rotational drive in the clockwise direction is transmitted to the housing 10 through the roller 42. As shown in FIGS. 2 and 3, the roller 42 is journaled over the pin 44 which is fixed in the housing 10. The roller 42 is adapted to engage a cam 46, FIG. 1, that is fixed on an axially movable piston rod 48. A piston 50 is received in a cylinder 52 to define a fluid motor which moves the cam 46 to the left, as seen in FIG. 1. When energized, the motor will produce a force on the roller 42 which pushes the housing 10 clockwise. A spring 54 at the left end of the piston rod 48 returns the cam 46 and piston 50 back to the right upon the deenergization of the piston and cylinder motor. A bias force is created on the housing 10 by a spring 56 which tends to rotate the housing 10 counter-clockwise. This holds the roller 42 in contact with the cam and moves the housing 10 counter-clockwise on the shaft 12 when the spring 54 moves the cam 46 from the left back to the position shown in FIG. 1. Thus, intermittent energization of the piston and cylinder motor (50, 52) and the effect of the springs 54, 56 combine to produce a reciprocating rotation of the housing 10. This in turn produces an incremental one-way rotation of the shaft 12 in the clockwise direction (as viewed in FIG. 1). A change in the slope of the surface of the cam 46 would result in a change in the amount of rotation per increment produced by the clutch mechanism at the shaft 12.

Figures 4, 5:
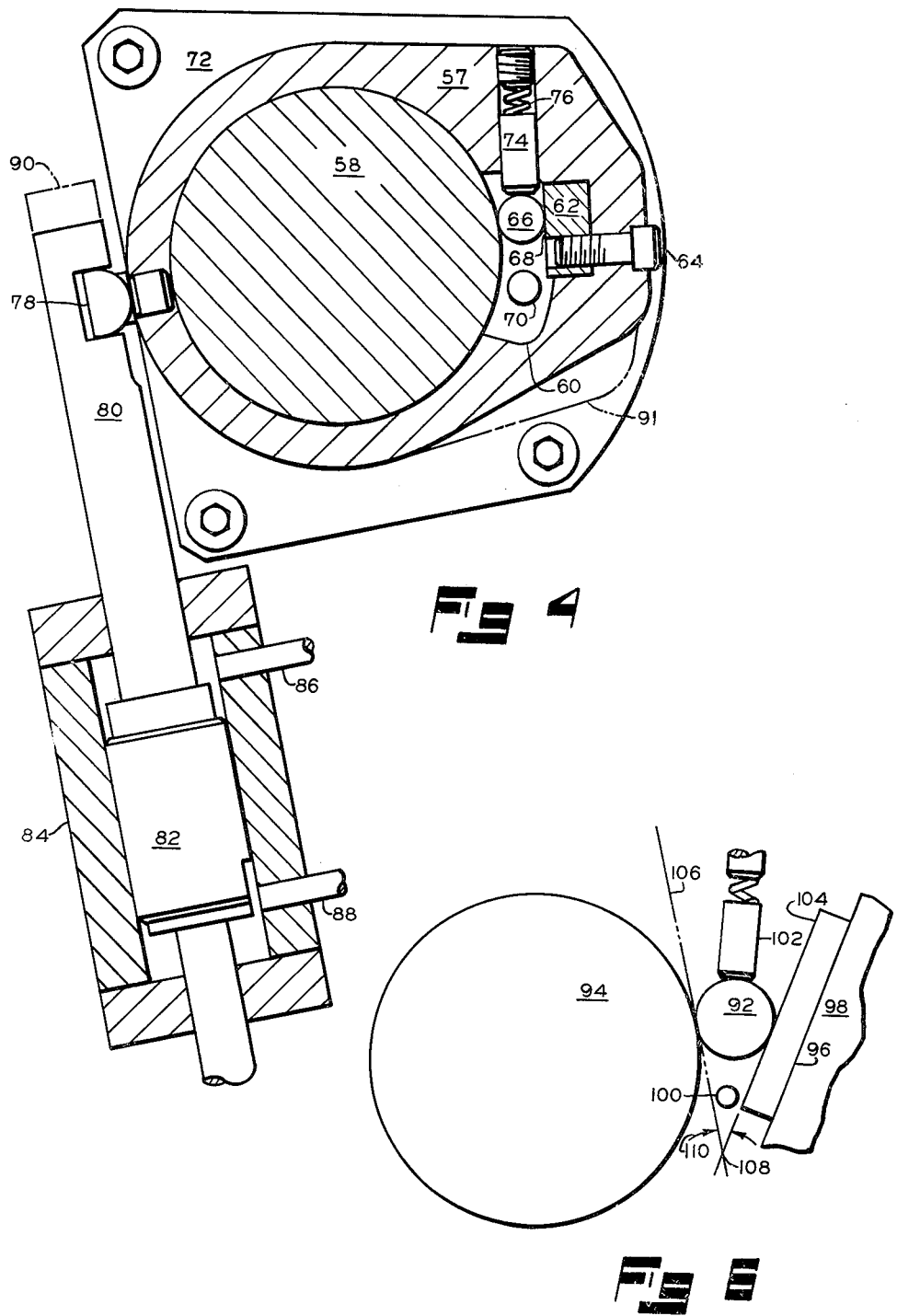
FIG. 4 is a section of an alternate clutch construction on line 4—4 of FIG. 5.
FIG. 5 is a perspective view of the alternate clutch construction.

FIGS. 4 and 5 illustrate an alternate embodiment of the clutch mechanism of this invention. A clutch housing 57 is rotatably received over a shaft 58 and a cavity 60 in the housing 57 extends part way around the shaft 58. A wedge member 62 is fixed in the housing 57 by a screw 64. A roller 66 is received between the shaft 58 and the wedge surface 68 of the member 62. A release pin 70 is fixed in a stationary mounting bracket 72 and extends into the cavity 60 on one side of the roller 66. A plunger 74 is slidably received in the housing 57 and is urged into contact with the roller 66 by a spring 76. A bell-end pin 78 is fixed in the housing 57. A piston rod 80 extends from a piston 82 and embraces the bell-end of the pin 78. The piston 82 is received in a cylinder 84 for reciprocal movement therein when fluid under high and low pressure is alternately connected to the fluid lines 86, 88.

Thus it is seen that the housing 57 may be reciprocally rotated to produce one-way incremental movement of the shaft 58. As the housing 57 is rotated in the counter-clockwise direction, the roller 66 is moved away from the release pin 70 and it wedges between the shaft 58 and surface 68 to carry the shaft 58 with the housing 57. As shown in FIG. 4, the housing 57 and piston 82 are in an intermediate position indicating the members are moving. If the piston 82 is moving downward, the housing 57 and shaft 58 are rotating together in the counter-clockwise direction. If the piston 82 is moving upward, the housing 57 is moving clockwise while the shaft 58 is stationary. When the piston 82 moves to the top of its stroke and the rod 80 is at the position 90, the housing 57 will have rotated to the position 91. The roller 66 will then have been moved to engagement with the release pin 70 which will move the roller 66 out of concurrent contact with the shaft 58 and surface 68. This will place the clutch mechanism in the released condition and the shaft 58 will be freely rotatable relative to the housing 57. The length of stroke of the piston 82 will determine the size of the increments of rotation of the shaft 58. As in the first embodiment, the clearance between the cavity 60 and release pin 70 limits the maximum size of the increments of rotation.

The simplified diagrammatic view of FIG. 6 shows the relationship of the basic parts of the clutch of this invention. The roller 92 is received between the rotatable shaft 94 and the wedge member 96. The member 96 is fixed to the housing 98 and the housing 98 is rotatable around the shaft 94. The release pin 100 extends parallel to the roller 92 on one side while the plunger 102 urges the roller 92 into concurrent contact with the shaft 94 and member 96 from the other side. The angular relationship between the plane 104 of the face of the wedge member 96 and the plane 106 tangent to shaft 94 and roller 92 at their line of contact is shown in exaggerated form in the diagram. The vertex 108 of the angle 110 formed by the planes 104, 106 is on the release pin side of the roller 92. When the housing 98 is moved counter-clockwise around the shaft 94 to tend to carry the roller 92 in a direction away from the vertex 108, the roller 92 wedges between the shaft 94 and member 96 to cause the shaft 94 to rotate with the housing 98. When the housing 98 is moved clockwise around the shaft 94 to tend to carry the roller 92 in the direction toward the vertex 108, the roller 92 does not wedge and the housing 98 rotates without driving the shaft 94.

Should the wedge member 96 be adjustable as the member 14 of the clutch in FIG. 1, the wedge angle 110 may be changed. If the member 96 is withdrawn from the shaft 94, the wedge angle 110 would be reduced and the vertex 108 would move a greater distance from the roller 92. A decreased wedge angle results in a more positive drive between the housing and shaft of the clutch. A more positive drive requires a greater break-loose force at the instant of reversal from the driving rotation (counter-clockwise in FIG. 6) of the housing 98 to its idle or return rotation (clockwise). Therefore the shaft 94 would require more loading to prevent the roller 92 from sticking and carrying the shaft 94 along with the housing 94 during the return rotation. The adjustable member 14 of the clutch in FIG. 1 then allows for an adjustment of the wedge angle of the clutch with the resulting change in break-loose force and the character of the drive provided. It is pointed out that generally when a system requires a more positive drive, a greater break-loose force may be used at the start of the idle return stroke without driving the system in reverse.

The adjustable wedge angle of the clutch in FIG. 1 also allows for take-up to compensate for wear and for inaccuracies of machining during fabrication of the clutch. The adjustability also allows for slight variation from optimum designed hardness and rigidity of the shaft 12, roller 22, and wedge member 14. The hardness and rigidity affect the positive character of the drive and the break-loose forces required in the system. With the adjustable wedge member 14, compensation can be made for these slight variations from design optimum.

What is claimed is:
1. A releasable one-way drive transmission comprising:
 (a) a rotatable shaft,
 (b) a clutch housing rotatably received around said shaft and having a plane wedge surface therein spaced from said shaft,
 (c) a sprag member loosely received between said shaft and wedge surface,
 (d) a yieldable plunger received in said housing and adapted to engage said sprag member to urge said sprag member into concurrent contact with said shaft and wedge surface, said wedge surface and a plane tangent to said shaft at the point of contact of said sprag member therewith defining a wedge angle having a vertex on the side of said sprag member opposite said plunger,
 (e) means to move said sprag member agains said plunger to prevent concurrent contact by said sprag member with said shaft and wedge surface to release said shaft for free rotation in either direction relative to said housing when said housing is in a predetermined angular position, and
 (f) means to rotate said housing a predetermined amount from said predetermined position in one direction tending to carry said sprag member away from the vertex of said wedge angle and to return said housing in the other direction to the prede- termined position, said sprag member wedging between said shaft and wedge surface only when said housing is rotated in said one direction to rotate said shaft with said housing.

2. A releasable one-way drive transmission comprising:
(a) a rotatable shaft,
(b) a clutch housing rotatably received around said shaft,
(c) a wedge member fixed in said housing and having a plane wedge surface spaced from said shaft,
(d) a cylindrical member loosely received between said shaft and wedge surface,
(e) a yieldable plunger received in said housing and adapted to engage one side of said cylindrical member to urge said cylindrical member into concurrent contact with said shaft and wedge surface, said wedge surface and a plane tangent to said shaft at the line of contact between said shaft and cylindrical member defining a wedge angle having a vertex on the side of said cylindrical member opposite said plunger,
(f) a fixed release pin extending into said housing and adapted to move said cylindrical member against said plunger and out of concurrent engagement with said shaft and wedge surface when said housing is in a predetermined angular position, said shaft freely rotatable in said housing when said cylindrical member is not in concurrent engagement with said shaft and wedge surface, and
(g) means to rotate said housing a predetermined amount from said predetermined position in one direction away from the vertex of said wedge angle and to return said housing in the other direction to the predetermined position, said cylindrical member wedging between said shaft and wedge surface only when said housing is rotated in said one direction to rotate said shaft with said housing.

3. A releasable one-way drive transmission comprising:
(a) a rotatable shaft,
(b) a clutch housing rotatably received around said shaft,
(c) a wedge member received in said housing and having a plane wedge surface spaced from said shaft,
(d) means to shift said wedge member in said housing to adjust said wedge surface relative to said shaft,
(e) a cylindrical roller loosely received between said shaft and wedge surface in said housing,
(f) a yieldable plunger received in said housing and adapted to engage one side of said roller to urge said roller into concurrent contact with said shaft and wedge surface, said wedge surface and a plane tangent to said shaft at the line of contact between said shaft and roller defining a wedge angle having a vertex on the side of the roller opposite said plunger, the relative spacing of said shaft and wedge surface determining the magnitude of said wedge angle,
(g) a fixed release pin extending into said housing and adapted to move said roller against said plunger and out of concurrent engagement with said shaft and wedge surface when said housing is in a predetermined angular position, said shaft freely rotatable in said housing when said roller is not in concurrent engagement with said shaft and wedge surface, and
(h) means to rotate said housing a predetermined amount from said predetermined position in one direction away from the vertex of said wedge angle and to return said housing in the other direction to the predetermined position, said roller wedging between said shaft and wedge surface only when said housing is rotated in said one direction to rotate said shaft with said housing.

4. A releasable one-way drive transmission comprising:
(a) a rotatable shaft,
(b) a clutch housing rotatably received around said shaft,
(c) a wedge member received in said housing and having a plane wedge surface spaced from said shaft,
(d) means to shift said wedge member in said housing to adjust said wedge surface relative to said shaft,
(e) a cylindrical roller loosely received between said shaft and wedge surface in said housing,
(f) a yieldable plunger received in said housing adapted to engage one side of said roller to urge said roller into concurrent contact with said shaft and wedge surface, said wedge surface and a plane tangent to said shaft at the line of contact between said shaft and roller defining a wedge angle having a vertex on the side of the roller opposite said plunger, the relative spacing of said shaft and wedge surface determining the magnitude of said wedge angle,
(g) a fixed release pin extending into said housing and adapted to move said roller against said plunger and out of concurrent engagement with said shaft and wedge surface when said housing is in a predetermined angular position, said shaft freely rotatable in said housing when said roller is not in concurrent engagement with said shaft and wedge surface,
(h) a bias mechanism operable to tend to hold said housing in said predetermined position, and
(i) a motor connected to said housing and operable to rotate said housing a predetermined amount and tending to carry said roller in one direction away from the vertex of said wedge angle, said bias mechanism returning said housing in the other direction to said predetermined position after movement by said motor means the predetermined amount, said roller wedging between said shaft and wedge surface only when said housing is rotated in said one direction to rotate said shaft with said housing.

References Cited by the Examiner
UNITED STATES PATENTS

| | | | |
|---|---|---|---|
| 872,999 | 12/07 | Malburg | 74—118 X |
| 879,016 | 2/08 | Starr | 192—47 |
| 2,380,778 | 7/45 | Murdock | 74—118 X |
| 2,507,756 | 5/50 | Boylan | 74—112 |
| 2,677,968 | 5/54 | Hubner | 74—112 |

BROUGHTON G. DURHAM, *Primary Examiner.*